United States Patent [19]

Naumann

[11] Patent Number: 4,662,586
[45] Date of Patent: May 5, 1987

[54] APPARATUS FOR MOVING AIRCRAFT

[75] Inventor: Herbert Naumann, Reinbek, Fed. Rep. of Germany

[73] Assignee: Blohm + Voss AG, Hamburg, Fed. Rep. of Germany

[21] Appl. No.: 691,566

[22] PCT Filed: May 9, 1984

[86] PCT No.: PCT/EP84/00138

§ 371 Date: Jan. 9, 1985

§ 102(e) Date: Jan. 9, 1985

[87] PCT Pub. No.: WO84/04506

PCT Pub. Date: Nov. 22, 1984

[30] Foreign Application Priority Data

May 10, 1983 [DE] Fed. Rep. of Germany ....... 3317052

[51] Int. Cl.⁴ .............................................. B64F 1/12
[52] U.S. Cl. .................................... 244/115; 254/283; 254/295
[58] Field of Search ................. 244/115, 116; 212/72, 212/205, 215, 228; 114/261; 254/283, 295; 104/183, 173 R

[56] References Cited

U.S. PATENT DOCUMENTS 2,922,625  1/1960  Heacock ............................ 104/183
3,533,358 10/1970  Leuenberger .
3,787,031  1/1974  Lucas ................................. 254/297
3,961,771  6/1976  Kumasaka ......................... 254/297
4,319,722  3/1982  Pesando ............................ 244/116
4,529,152  7/1985  Bernard ............................ 244/116

FOREIGN PATENT DOCUMENTS 8301428  4/1983  Australia .
0047638  3/1982  European Pat. Off. .
 190546  7/1957  Fed. Rep. of Germany ...... 254/295
  93264  3/1969  France .
1533975  7/1978  France .
 598132  4/1978  Switzerland .

Primary Examiner—Joseph F. Peters, Jr.
Assistant Examiner—Lynn M. Fiorito
Attorney, Agent, or Firm—Merchant, Gould, Smith, Edell, Welter & Schmidt

[57] ABSTRACT

An apparatus for moving aircraft on flat surfaces with the aid of cables which, on the one hand, act on the aircraft and, on the other hand, pass to winch drums via guide pulleys which are in part displaceable is characterized in that, for moving aircraft, in particular helicopters, multi-drum winches are provided on a ship's deck with the winch drums being drivable via differential transmissions by two motors which are controllable by means of a joystick operable in the sense of the intended movement of the aircraft.

13 Claims, 13 Drawing Figures

FIG. 9

APPARATUS FOR MOVING AIRCRAFT

The invention relates to an apparatus for moving aircraft on flat surfaces with the aid of cables which, on the one hand, act on the aircraft and, on the other hand pass to winch drums via guide pulleys which are in part displaceable.

The invention is based on the problem of making the known moving apparatus suitable for use onboard ships for aircraft, in particular for helicopters, in order to be able to move them selectively, even during severe listing of the ship, at constant speed from the landing location to the parking location and from the parking location back to the starting location. In so doing a helicopter, for example, can be moved on its undercarriage or by means of a transport trolley with the cables being operated from a specially constructed winch.

The apparatus of the present invention has the advantage that as soon as the helicopter has been connected to the cables all attached cables can be tensioned by means of the winch so that lateral displacement of the helicopter on the deck of the ship can be avoided during possible listing of the ship. After the cables have been tensioned the helicopter is moved by means of the winch to its allocated location with the pretension in the cables also being maintained during movement of the helicopter. The cables leading from the winch to the helicopter can run on the deck, whereas the cables extending from the helicopter to the winch via deflection pulleys can extend on or below deck, in the latter case, the cables are passed to the winch and are suspended by means of pulleys. Further details of the invention, in particular of the winch, can be found in the subordinate claims.

The invention will now be explained in more detail with reference to several graphically illustrated embodiments. There are shown:

FIG. 5b is a view taken in elevation of the view of FIG. 5a;

Figure 1A:
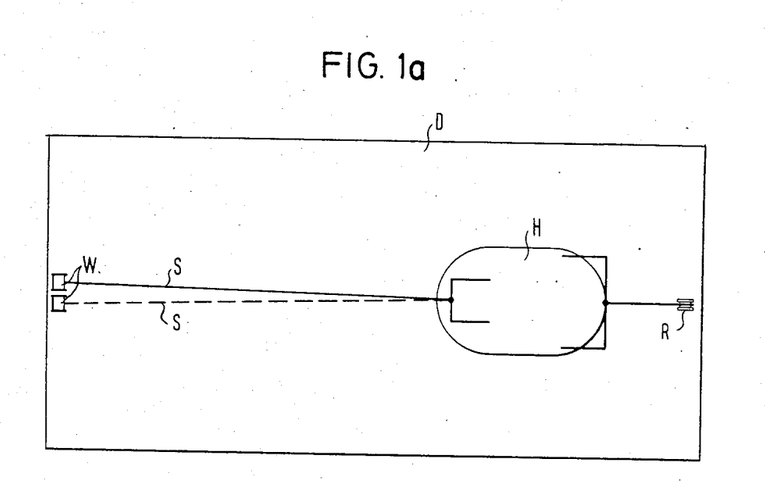
FIG. 1a is a plan view of a moving apparatus in accordance with the invention and having two cables.
Figure 1B:
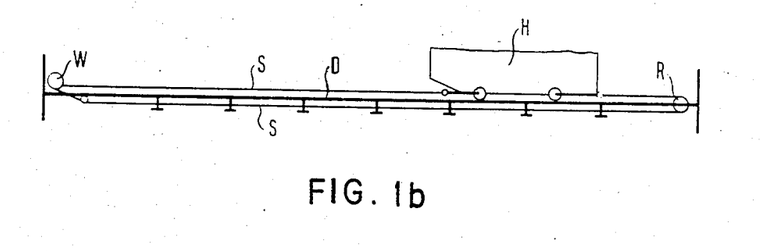
FIG. 1b is an elevational view taken in section of the view of FIG. 1.

Referring to FIGS. 1a and 1b, the pretension force is selected in the winch W, through the path of the two cables S in an almost common axis, to be just sufficiently high that slight lateral movements of the helicopter H are possible on the deck B during listing of the ship in order to keep the loading of the cables S low.

Figure 2:
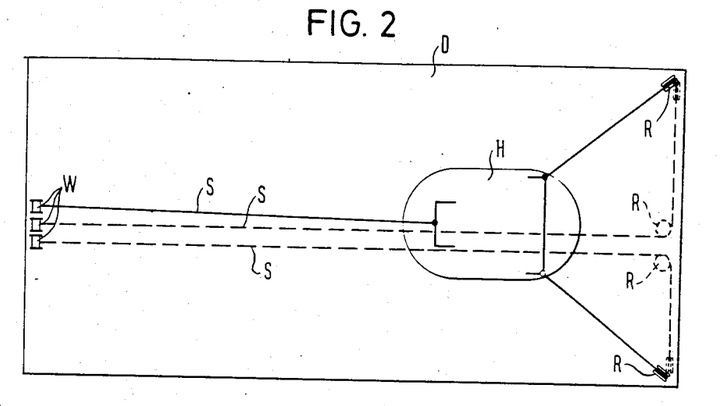
FIG. 2 is a moving apparatus in accordance with the present invention having three cables.

In accordance with FIG. 2 lower forces occur in the cables S, in accordance with the parallelogram of the cable forces, through the side forces acting on the helicopter H than would occur with a straight path of the cables S for the same forces in the moving apparatus of FIGS. 1a and 1b.

Figure 3:
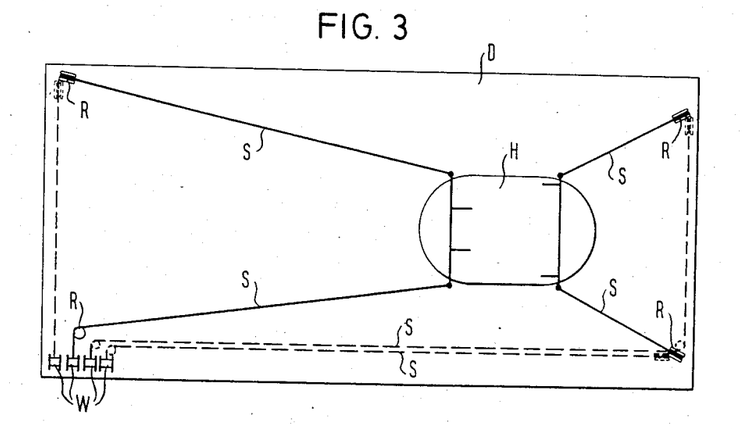
FIG. 3 is a moving apparatus in accordance with the present invention having four cables.
Figure 4A:
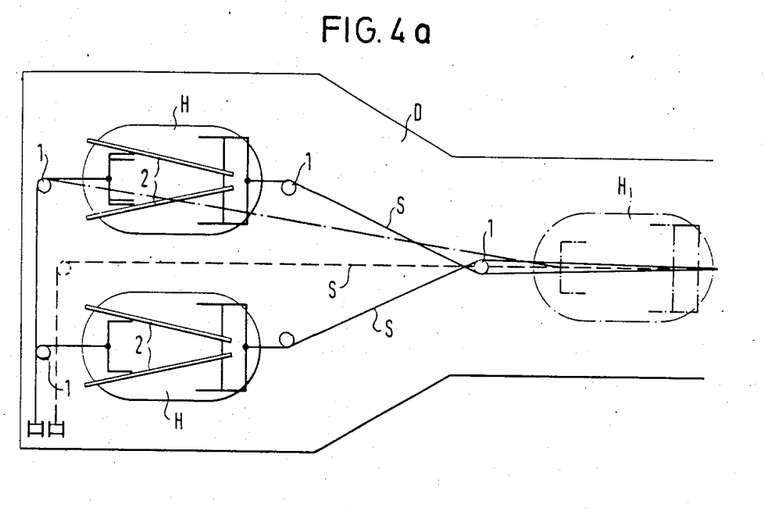
FIG. 4a is a moving apparatus in accordance with the present invention for serving two parking locations.
Figure 4B:
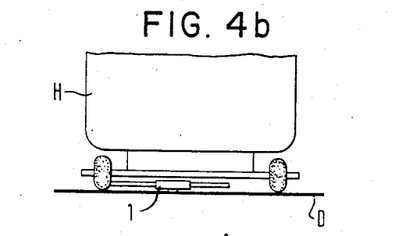
FIG. 4b is a view taken in elevation of a moving apparatus of FIG. 4 showing a deflection pulley and a helicopter to be moved.
Figure 4C:
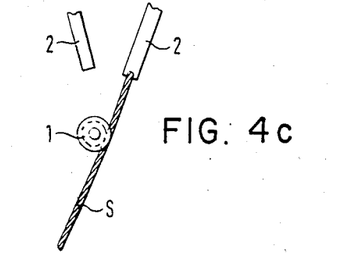
FIG. 4c is a view showing in greater detail an arrangement between a deflection pulley and guide rails of the present invention.

In accordance with FIG. 3 the cable forces are further reduced in comparison with the moving apparatus of FIG. 2. Referring to FIGS. 4a, 4b and 4c, the requirement for two parking locations in the moving apparatus of FIGS. 1a and 1b, 2 and 3 is satisfied by the provision of removable deflection pulleys 1, the positioning of which allows the path of the cables S to be changed.

Figure 5A:
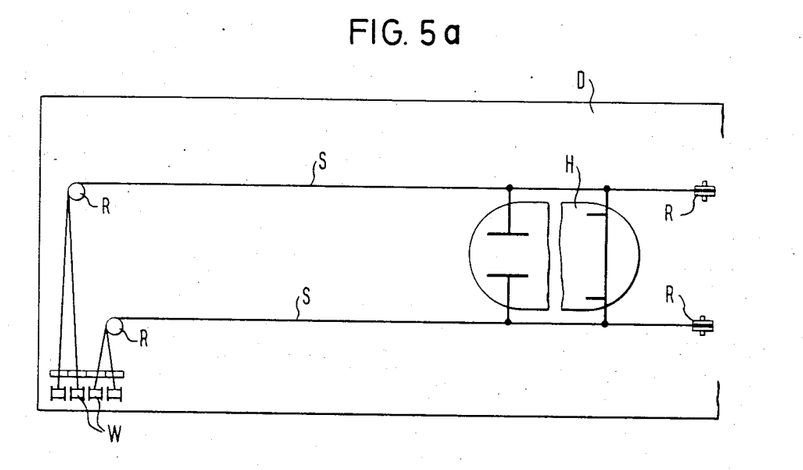
FIG. 5a is a plan view of a moving apparatus according to the present invention with two cables.
Figure 5B:
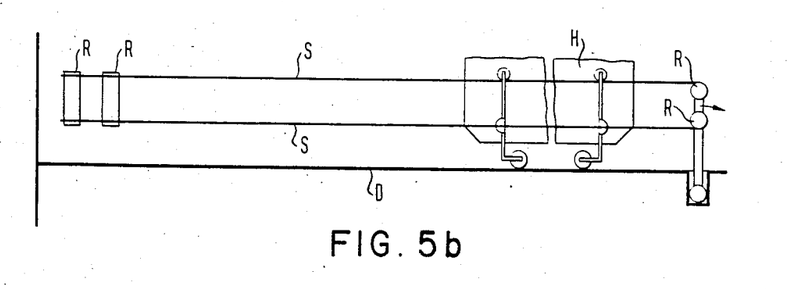

Furthermore, guide rails 2 which can also extend in a curve can be provided beneath or alongside the helicopter H. In accordance with FIGS. 5a and 5b the cables S are guided over the deck D in such a way that they form a retaining fence alongside the two longitudinal sides of the helicopter H. For this purpose the helicopter H is laterally secured to the cables S which extend in its direction of movement and is additionally held against overturning by means of pulleys at the counter-extending cables. The retaining fence with the cable pulleys R which is erected on the deck D of the ship can be removed from the deck D after use, and the cable pulleys R together with their mount can also be folded in the direction of the arrow.

Figure 6:
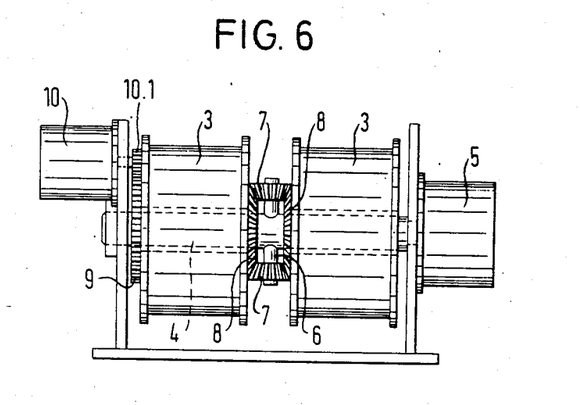
FIG. 6 shows a winch for a moving apparatus having two cables.
Figure 7:
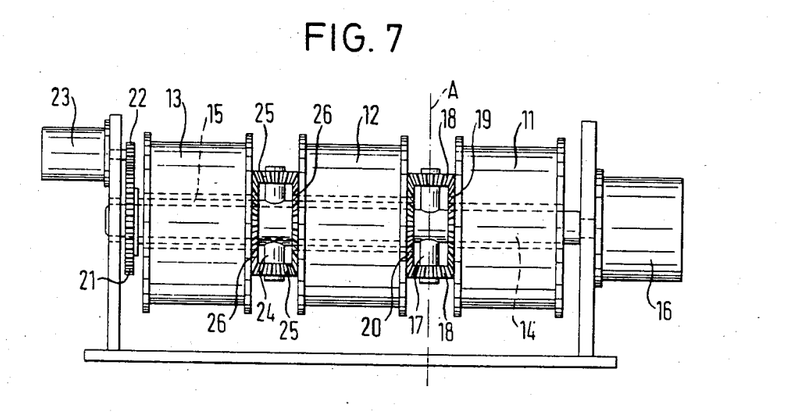
FIG. 7 shows a winch for a moving apparatus having three cables and showing a line of symmetry for a moving apparatus having four cables.

FIGS. 6 and 7 represent specially laid out differential winches for the moving apparatuses and the drive for the differential winches can take place hydraulically, electrically or pneumatically. The cables which extend to or from the helicopter are drawn with constant force by means of the differential winches. The cables are reeled onto the cable drums in the same sense of rotation.

FIG. 6 shows by way of example a differential winch for the moving apparatus of FIGS. 1a and 1b, 4a, 4b, and 4c. The differential winch has two cable drums 3 which are journalled on a rotatable shaft 4 with the shaft 4 experiencing a torque from the motor 5 in the cable tensioning direction. Stub shafts 6 are arranged on and fixedly connected with the shaft 4 and bevel gears 7 are journalled on the stub shafts 6, with the bevel gears in turn meshing with bevel gears 8 which are secured to the cable drums 3. One of the two cable drums 3 has a spur gear 9 with which the pinion 10.1 of the motor 10 meshes. In contrast to the motor the direction of rotation of the motor 10 can be changed.

The operation and functioning of the winch is as follows: Before a helicopter is moved the cables are connected with the helicopter at the points of attachment that are provided. Once this work is complete the motor 5 is switched on whereupon the shaft 4 rotates in the cable tensioning direction with the bevel gears 7. The bevel gears transmit at both sides a uniform torque to the cable drums 3 whereby each drum 3 reels in its cable. During this the motor 10 runs freely herewith. If the cable has been pulled tight at one of the two cable drums 3 this cable drum 3 remains stationary and the bevel gears 7 roll off on the now fixed bevel gear 8 of this cable drum, whereby the other cable drum 3 continues to turn until its cable is pulled tight. As a result of this the motor 5 becomes stationary but continues to exert a uniform torque on the two cable drums 3 in the cable tensioning direction via the bevel gears 7 and 8.

The size of the torque is sealed so that a sufficiently large pretension is exerted on the cable. If the helicopter is now to be moved the motor 10 is switched to the desired direction of rotation. As a result one of the two drums 3 is rotated by means of the gear wheel 9 and the pinion 10.1 and the other drum is simultaneously moved in the reverse direction of rotation via the bevel gears 7 and 8. The cables are unreeled under tension from one cable drum and reeled under tension by the other cable drum 3 and the differential cable speeds which occur through the use of deflection rollers as a result of oblique parts of the cable are also balanced out by the bevel gears 7 and 8 so that they provide the cable drums 3 with different speeds of rotation while maintaining the cable pretension. As a result of this manner of operation of the differential winch safe movement of a helicopter is possible even during severe listing of the ship.

FIG. 7 shows a winch which is provided for the moving apparatus of FIG. 2. The winch has three cable drums 11, 12 and 13 of which the cable drum 11 is journalled on the rotatable shaft 14, whereas the cable drums 12 and 13 are journalled on a hollow shaft 15 which is in turn journalled on the shaft 14. The shaft 14 experiences a torque from the motor 16 in the cable tensioning direction and this torque is transmitted, by means of the stub shafts 17 which are fixedly connected with the shaft 14 and the bevel gears 18 which are journalled on the stub shafts 17, to the bevel gears 19 and 20 which are connected with the cable drum 11 and with the hollow shaft 15. A spur gear 21 with which the pinion 22 of the motor 23 engages is secured to the hollow shaft 15. Furthermore, stub shafts 24 are secured between the cable drums 12 and 13 to the hollow shaft 15 and bevel gears 25 which mesh with bevel gears 26 secured to the cable drums 12 and 13 are journalled on the stub shafts 24. The manner of operation of this winch is the same as for the winch of FIG. 6 if one considers the cable drums 12 and 13 together with its hollow shaft 15 as being a rigid unit. The cable drums 12 and 13 are intended for the cables which extend obliquely to the helicopter from the stern of the ship. It is ensured by means of the bevel gears 25 and 26 that the cable drums 12 and 13 are also uniformly pretensioned when the cables extend at different angles to the direction of movement of the helicopter. If the pretension of the cables is sufficiently large the helicopter is so positioned by means of the cable drums 12 and 13 coupled by the bevel gears 25 and 26 that the cables which extend on both sides from the stern of the ship to the helicopter have the same angle of inclination to the direction of movement of the helicopter.

The winch for the moving apparatus of FIG. 3 has four cable drums with the winch being executed in the same way as the part of the winch of FIG. 7 located on the left hand side of the axis A, and being constructed symmetric to the axis A. With this arrangement it is however possible to do away with a further motor 23 for the drive of the hollow shaft 15 at the right of the axis A. The cables are so arranged that the two cable drums 12 and 13 arranged to the left or right of the axis of symmetry A pick up cables which have a common force direction in the direction of movement of the helicopter.

In accordance with the invention the cable drums of the winches can be individually braked which makes it possible, with a cable arrangement in accordance with FIG. 2 and FIG. 3, not only to move the helicopter in the direction of its longitudinal axis but also transverse thereto, and also to position the helicopter obliquely.

Figure 8:
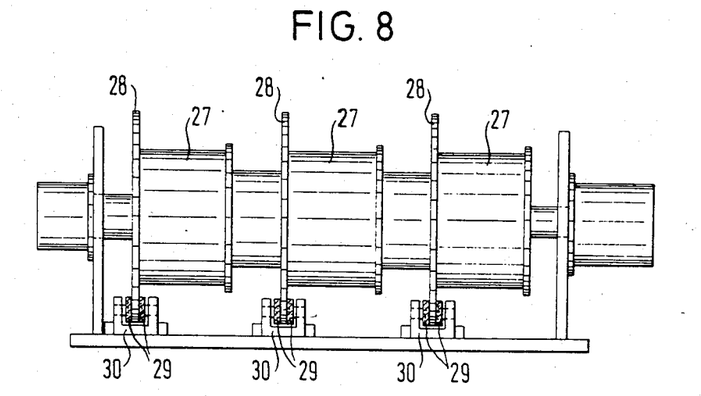
FIG. 8 shows a braking device for winch cables.

FIG. 8 illustrates a winch in which each cable drum 27 has a cheek 28 of enlarged diameter which has a friction surface at both end faces with brake blocks 29. The brake blocks 29 are secured in a fork-like holder 30 which also has the pressing means for the brake blocks 29. The brake blocks can be actuated mechanically, hydraulically, electrically or pneumatically. With hydraulic actuation the pressure pistons for the brake blocks 29 can be actuated via a switching valve from a pressure line which leads to the motors of the winch. For safety reasons the brake blocks 29 are engaged in a hydraulic arrangement by means of spring force and are ventilated by means of hydraulic pressure, so that the winches are automatically braked in the event of a breakdown in the hydraulic installation. If this happens the helicopter continues to be held by means of the cables. A hydraulic hand pump is provided for releasing the brake blocks in the emergency case. A control console having control valves which are controlled by means of a control lever is provided for operation of the moving apparatus. The control valves are so coupled with the control lever that the helicopter to be moved moves in accordance with the position of the control lever, with the cable drums being automatically braked during their rotation via the valves.

Figure 9:
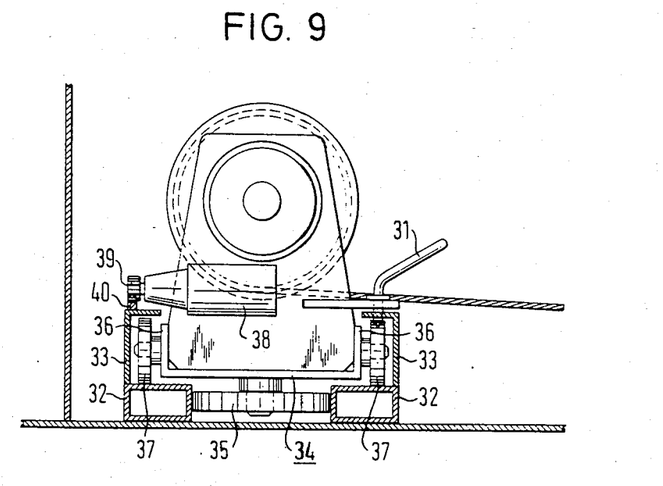
FIG. 9 shows a displaceable winch.

Furthermore, in the event of a cable breakage, braking of the cable drum affected by the cable breakage can be initiated by cable sensors and torque measuring devices. In order to move several helicopters onboard ship from the landing grid to their parking locations and back it is possible to avoid the arrangement of deflection pulleys which is otherwise necessary for this purpose by making the winch itself displaceable. FIG. 9 shows a differential winch which can be displaced by means of rollers on a rail system which has been particularly constructed for this purpose. The differential winch can be fixed at its working points by means of a linch pin 31. The rail system consists of two rails which extend in mirror image fashion relative to one another and which consists of a flat bar or a rectangular hollow section 32 secured to the ship's deck with a U-shaped or angled section 33 being fastened to the flat bar or rectangular hollow section. Whereas the rollers 35 which are horizontally attached beneath the base plate 34 of the winch are guided by the flat bars or the rectangular hollow sections 32, vertical rollers 37 are arranged to the end faces or to the angled side 36 of the base plate 34, with the vertical rollers running in the inner space formed in the U-section or by the flat bar or rectangular hollow section together with the angled section 33. Furthermore, the differential winch can have a displacement motor 38 with an inbuilt brake, which can move the differential winch even when the cables are loaded by means of its pinion 39 and a toothed bar 40 secured to the rail system. The displacement and braking is brought about from the control console.

I claim:

1. Apparatus for moving an aircraft on a flat surface comprising a first cable connected to said aircraft on a first end thereof for pulling it in a first direction; a second cable connected to said aircraft on a second end opposite said first end for pulling it in an opposite direction; a pulley for changing the direction of at least one of said cables so that portions of said first and second cables are disposed alongside one another; a first winch drum for reeling and unreeling said first cable; a second winch drum for reeling and unreeling said second cable, said second winch drum being disposed adjacent to said first winch drum at a position where said cables are disposed alongside one another; said first and second winch drums disposed with said aircraft disposed between said winch drums and said pulley; an axle extending through said first and second winch drums on which said winch drums are rotatably mounted; a differential gear mechanism disposed between said first and second winch drums, said differential gear mechanism comprising a first bevel gear mounted on said first drum, a second bevel gear mounted on said second drum facing said first bevel gear, first and second stub shafts projecting transversely from said axle between said first and second bevel gears, and third and fourth bevel gears mounted on respective ones of said first and second stub shafts and meshing with said first and second bevel gears; a first motor connected to said axle for driving said axle, whereby to drive said first and second winch drums via said differential gear mechanism to tension said first and second cables; and a second motor drivingly connected to one of said winch drums without being drivingly connected to said axle for driving said one of said winch drums to produce movement of said aircraft, whereby said bevel gears ensure that said cables are unreeled under tension from one of said winch drums and reeled under tension by the other of said winch drums.

2. Apparatus in accordance with claim 1 wherein a respective brake is provided for each said winch drum, and wherein each of said winch drums has an enlarged drum cheek and the associated brake acts on said enlarged drum cheek.

3. Apparatus in accordance with claim 2 wherein spring means is provided for engaging said brakes and one of mechanical, hydraulic, electrical or pneumatic means is provided for releasing them.

4. Apparatus for moving an aircraft on a flat surface comprising a first cable connected to said aircraft for pulling it in a first direction; a second cable connected to said aircraft for pulling it in an opposite direction; at least one deflection pulley for changing the direction of at least one of said cables so that portions of said first and second cables are disposed alongside one another; a first winch drum for reeling and unreeling said first cable; a second winch drum for reeling and unreeling said second cable, said second winch drum being disposed adjacent to said first winch drum at a position where said cables are disposed alongside one another; an axle extending through said first and second winch drums on which said winch drums are rotatably mounted; a differential gear mechanism disposed between said first and second winch drums, said differential gear mechanism comprising a first bevel gear mounted on said first drum, a second bevel gear associated with said second drum facing said first bevel gear, first and second stub shafts projecting transversely from said axle between said first and second bevel gears, and third and fourth bevel gears mounted on respective ones of said first and second stub shafts and meshing with said first and second bevel gears; a first motor for driving said axle, whereby to drive said first and second winch drums via said differential gear mechanism to tension said first and second cables; and a second motor for driving said second winch drum to produce movement of said aircraft; a third cable connected to said aircraft for pulling it in a direction oblique to said second cable; deflection pulley means for changing the direction of said third cable so that portions of said first, second and third cables are disposed alongside one another; a third winch drum for reeling and unreeling said third cable, said third winch drum being disposed adjacent to said second winch drum at a position where said cables are disposed alongside one another; a hollow axle freely rotatably journalled on the first said axle and extending through said second and third winch drums, which are freely rotatably journalled on said hollow axle, said second bevel gear being secured to said hollow axle; and a second differential gear mechanism disposed between said second and third winch drums and comprising a fifth bevel gear mounted on said second winch drum, a sixth bevel gear mounted on said third winch drum facing said fifth bevel gear, third and fourth stub shafts projecting transversely from said hollow axle between said fifth and sixth bevel gears, and seventh and eighth bevel gears mounted on respective ones of said third and fourth stub shafts and meshing with said fifth and sixth bevel gears; wherein said second motor is drivingly connected to said second and third winch drums via said hollow axle, said third and fourth stub shaft and said fifth, sixth, seventh and eighth bevel gears.

5. Apparatus in accordance with claim 4, the apparatus further comprising a fourth cable connected to said aircraft for pulling it in a direction oblique to said first cable; further deflection pulley means for changing the direction of said fourth cable so that portions of said first, second, third and fourth cables are disposed alongside one another, a fourth winch drum for reeling and unreeling said fourth cable, said fourth winch drum being disposed adjacent to said first winch drum at a position where said cables are disposed alongside one another; a second hollow axle freely rotatably journalled on said first axle and extending through said first and fourth winch drums which are freely rotatably journalled on said second hollow axle; and a third differential gear mechanism disposed between said first and fourth winch drums and comprising a ninth bevel gear mounted on said first winch drum, a tenth bevel gear mounted on said fourth winch drum facing said ninth bevel gear, fifth and sixth stub shafts projecting transversely from said second hollow axle between said ninth and tenth bevel gears, and eleventh and twelfth bevel gears mounted on respective ones of said fifth and sixth stub shafts and meshing with said ninth and tenth bevel gears; wherein said first bevel gear is secured to said second hollow axle instead of being mounted on said first drum.

6. Apparatus in accordance with claim 5 wherein a respective brake is provided for each said winch drum, and wherein each of said winch drums has an enlarged drum cheek, and the associated brake acts on said enlarged drum cheek.

7. Apparatus in accordance with claim 6 wherein spring means is provided for engaging said brakes and one of mechanical, hydraulic, electrical or pneumatic means is provided for releasing them.

8. Apparatus in accordance with claim 4 wherein a respective brake is provided for each said winch drum, and wherein each of said winch drums has an enlarged drum cheek and the associated brake acts on said enlarged drum cheek.

9. Apparatus in accordance with claim 8 wherein spring means is provided for engaging said brakes and one of mechanical, hydraulic, electrical or pneumatic means is provided for releasing them.

10. Apparatus for moving an aircraft on a flat surface comprising first cable means connected to said aircraft on a first end thereof for pulling it in a first direction; second cable means connected to said aircraft on a second end thereof opposite said first end for pulling it in an opposite direction; pulley means for changing the direction of at least said first cable means; first winch drum means for reeling and unreeling said first cable means; second winch drum means for reeling and unreeling said second cable means; a differential gear mechanism disposed between said first and second winch drum means; said first and second winch drum means disposed with said aircraft disposed between said winch drums and said pulley; axle means extending through both said first and second winch drum means, said axle means being drivingly connected to said differential gear mechanism; a first motor connected to said axle for driving said first and second winch drum means via said axle and said differential gear mechanism whereby to tension said first and second cable means; and a second motor connected to one of said first and second winch drum means without being drivingly connected to said axle for driving said one of said first and second winch drum means to produce movement of said aircraft, whereby said differential gear mechanism ensures that one of said cable means is unreeled under tension from one of said winch drum means, while the other of said cable means is reeled under tension from the other said winch drum means.

11. Apparatus in accordance with claim 10 wherein said first and second winch drum means are mounted on the deck of a ship, and wherein means is provided for moving said first and second winch drum means to different positions on said deck and for securing them in said different positions.

12. Apparatus in accordance with claim 10 wherein said first and second cable means extend alongside said aircraft at a height such that they form a retaining fence alongside the aircraft and prevent overturning thereof.

13. Apparatus in accordance with claim 1, wherein a joystick control is provided for controlling said first and second motors and thereby said first and second winch drum means.

* * * * *

UNITED STATES PATENT AND TRADEMARK OFFICE
CERTIFICATE OF CORRECTION

PATENT NO. : 4,662,586

DATED : May 5, 1987

INVENTOR(S) : Herbert Naumann

It is certified that error appears in the above-identified patent and that said Letters Patent is hereby corrected as shown below:

Column 3, line 1, "sealed" should be --selected--;

Column 4, line 48, "arranged" should be --attached--; and

Column 8, line 18, "claim 1" should be --claim 10--.

Signed and Sealed this

Sixth Day of October, 1987

Attest:

DONALD J. QUIGG

*Attesting Officer*  *Commissioner of Patents and Trademarks*